Patented Dec. 28, 1948

2,457,335

UNITED STATES PATENT OFFICE 2,457,335

PROCESS FOR INCREASING TACKINESS OF RUBBER-LIKE MATERIALS

Ira Williams and Clinton A. Carlton, Borger, Tex., assignors to J. M. Huber Corporation, New York, N. Y., a corporation of Delaware No Drawing. Application March 13, 1944, Serial No. 526,320

9 Claims. (Cl. 260—27)

This invention relates to rubber and more particularly to the treatment of rubber to impart a desirable tackiness to the surface of the unvulcanized rubber and to improve the nature of the vulcanized product. While many substances have been designated as rubber we mean to include only natural rubber and those substances prepared from hydrocarbon dienes.

In the preparation of articles from rubber, it is often necessary to assemble articles from smaller pieces. For example, a tire is constructed by applying layers of rubber coated fabric to each other, followed by the breaker strip, cushion and tread. All of the layers must possess sufficient surface tack to adhere firmly and maintain the desired relative position of the various parts before vulcanization. This lack of tackiness in many cases causes great difficulty in the building operation. This is particularly true of synthetic rubbers such as the butadiene styrene copolymers and with most rubbers which contain a relatively large amount of carbon black.

Various methods have been employed for overcoming this difficulty. In the case of natural rubber, softness and tackiness can be developed to a certain extent by prolonged milling either alone or in the presence of various softeners or plasticizing agents such as oils or thiophenols. Such treatments are usually conducted in the absence of carbon black. Synthetic rubbers and particularly butadiene rubbers are much less susceptible to the action of milling and little surface tack will develop even in the presence of materials or reagents which produce a decided softness in natural rubber. Attempts have been made to improve the tack of such rubbers by the inclusion of large amounts of resinous substances which are themselves of a tacky nature. Ordinary rosin has been added, but aside from not producing the expected degree of tackiness it has a very great retarding action on the vulcanizing process.

The primary object of the present invention is to provide a class of rubber compounds having an improved surface tack. Another object is to provide a class of substances which will assist in the production of tackiness. A further object is to improve the surface tack of rubber containing large amounts of carbon black. A still further object is to provide a resinous substance which will improve tackiness without retarding vulcanization and which will improve the properties of the vulcanized product. Other objects will appear in the description of this invention.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Broadly stated this invention comprises the process of increasing the surface tackiness of unvulcanized rubber and particularly natural rubber containing a consequential amount of carbon black or synthetic rubber of the character prepared from diene hydrocarbons, with or without the inclusion of consequential amounts of carbon black, by treating the same with amine salts of resin acids.

The resin acids which we prefer are those substances which are usually of natural origin and which tend to deposit non-crystalline films from solution. In particular we prefer to use abietic acid or its various polymerized, hydrogenated or chlorinated forms.

The amines which we employ are non-volatile alkyl or aralkyl amines sufficiently basic to form stable salts. In general such amines should have a basic dissociation constant greater than about $10^{-5}$ and the boiling point should be above the vulcanizing temperature of the rubber compound in which they are used. We prefer to use the ethanol amines and in particular either diethanol or triethanolamine or a mixture of these. Accordingly when the term alkyl-containing amines is used hereinafter it is intended to include the alkyl amines, the aromatic substituted alkyl amines, and the hydroxy substituted alkyl amines.

The salts of abietic acid with the amines are readily prepared by heating the substances together at a temperature high enough that the products can be readily mixed. For example, cetyl dimethylamine, dioctylamine or triethanolamine when heated with abietic acid in molecular proportions all give soft resinous products which are readily incorporated into rubber.

The effectiveness of these materials when added to rubber is illustrated in the following examples:

EXAMPLE 1

GR–S synthetic rubber which is a copolymer of butadiene and styrene was sheeted on a rubber mill and found to have almost no surface tack. Three percent of triethanol ammonium abieate was then milled into the rubber. The surface tack was improved by this treatment. Treatment of the rubber with three percent of abietic acid increased the tack somewhat less than treatment with the triethanol ammonium salt.

EXAMPLE 2

GR-S rubber was treated on a rubber mill with half its weight of channel black. Sheets of this compound would not adhere when pressed together under heavy pressure. One part of this carbon black compound was treated with three percent, based on the weight of rubber, of abietic acid. The improvement in tackiness was slight. Another part was treated with three percent of triethanol ammonium abieate based on the weight of rubber. When two sheets of this rubber were pressed together between the thumb and finger the adherence was sufficient that the original surface was destroyed when the sheets were separated.

EXAMPLE 3

Fifty parts of carbon black, 5 parts of zinc oxide, 2 parts of sulfur and 1.5 parts of "Santocure" accelerator were incorporated into 100 parts of GR-S rubber. This compound was divided into three portions. One portion was treated with 3 percent of wood rosin based on the weight of the rubber. Another portion was treated with 3 percent of the soft resin formed by reacting 320 parts of wood rosin with 149 parts of triethanolamine. The portion treated with rosin had very little surface tack and two sheets would not cling together. The portion treated with the amine salt had sufficient tack that the surfaces of two sheets would tend to fuse together when pressed together between the thumb and finger. The portion which was untreated had no surface tack.

EXAMPLE 4

The three portions of Example 3, were vulcanized and the physical properties were determined as shown in the following table.

*Physical properties in pounds per sq. inch*

| Min Cure @ 280° F. | Untreated | | Rosin Treated | | Amine Salt Treated | |
|---|---|---|---|---|---|---|
| | Load @ 300% Elong. | Tensile @ Break | Load @ 300% Elong. | Tensile @ Break | Load @ 300% Elong. | Tensile @ Break |
| 15 Min | 560 | 1,480 | | 400 | 1,300 | 3,000 |
| 30 Min | 1,480 | 2,970 | 800 | 2,320 | 1,680 | 2,930 |
| 45 Min | 1,850 | 2,820 | 1,300 | 2,900 | 1,820 | 3,000 |
| 60 Min | 1,980 | 2,600 | 1,420 | 2,970 | 1,860 | 3,020 |
| 75 Min | 2,200 | 2,600 | 1,580 | 2,800 | 1,880 | 2,960 |
| 90 Min | 2,220 | 2,640 | 1,640 | 2,720 | 1,880 | 2,930 |

These figures show that the untreated stock continues to stiffen during the entire vulcanizing range. The vulcanization of the stock treated with rosin was very much retarded and this stock also tended to stiffen during the entire period. The compound treated with the amine salt vulcanized more rapidly and tended to reach a maximum after which it no longer tended to change. This property of resisting over-vulcanization is very valuable with GR-S rubber, because it helps to resist the brittleness in such compounds at temperatures such as develop in tires during service.

EXAMPLE 5

In one case 100 grams of smoked sheet were treated by milling with 25 grams of carbon black and 4 grams of diethanol ammonium abieate formed by heating together 305 grams of abietic acid and 105 grams of diethanol amine. A second 100 grams of smoked sheet was treated with 25 grams of carbon black and 4 grams of ethanol ammonium abieate formed by heating together 305 grams of abietic acid and 61 grams of ethanol amine. Both of these compounds were found to have more surface tack than a compound containing carbon, but no abietic acid salt. A similar set of experiments omitting the carbon black showed the abietic acid salts to add somewhat to the tack, but to be of less value than in the presence of carbon black.

While we have described only the use of rosin and abietic acid for the preparation of the amine salts, other sources of abietic acid are available. One such source of abietic acid is pine tar. Another useful source is tall oil, although this is not a preferred source because the oleic acid salts are not desirable as tack inducing agents. Hydrogenated tall oil is less objectionable, but is not as desirable as rosin or abietic acid.

The amines and the abietic acid should preferably be warmed together before addition to the rubber, because of the difficulty of incorporation of the amine when added separately. The amine and acid can be reacted in molecular proportions or if desired an excess of either may be present. It is generally desirable to employ a slight excess of the acidic material.

While these materials are effective in producing tack and smoothing out vulcanization of natural and hydrocarbon butadiene rubbers in the absence of carbon, we find that the presence of ten or more parts of carbon black is beneficial and in the case of synthetic rubbers, is necessary to secure good tack and good vulcanization. Other compounding ingredients may be present.

Other modes of applying the principle of the invention may be employed, change being made as regards the details described, provided the features stated in any of the following claims or the equivalent of such be employed.

We therefore particularly point out and distinctly claim as our invention:

1. A process of increasing the surface tackiness of an unvulcanized rubber, which comprises milling butadiene styrene copolymer with an abietic acid salt of triethanolamine.

2. A process of increasing the surface tackiness of an unvulcanized rubber, which comprises milling butadiene styrene copolymer with an abietic acid salt of an ethanolamine.

3. A process of increasing the surface tackiness of an unvulcanized rubber, which comprises milling butadiene styrene copolymer with a salt formed by reacting with a rosin acid upon an ethanolamine which has a basic dissociation constant greater than $10^{-5}$ and boiling point above the vulcanizing temperature.

4. A process of increasing the surface tackiness of an unvulcanized rubber, which comprises incorporating in a solid rubber consisting at least predominantly of diene hydrocarbon polymer, an abietic acid salt of triethanolamine.

5. A process of increasing the surface tackiness of an unvulcanized rubber, which comprises incorporating in a solid rubber consisting at least predominantly of diene hydrocarbon polymer, an abietic acid salt of an ethanolamine.

6. A process of increasing the surface tackiness of an unvulcanized rubber, which comprises incorporating in a solid rubber consisting at least predominantly of diene hydrocarbon polymer, a salt formed by reacting abietic acid upon an amine of the class of aliphatic amines in which any oxygen is connected to the carbon by only one bond and consisting of cetyl dimethylamine, dioctylamine and ethanolamines.

7. A process of increasing the surface tackiness of an unvulcanized rubber, which comprises incorporating in a solid rubber consisting at least predominantly of diene hydrocarbon polymer, a salt of a rosin acid and triethanolamine.

8. A process of increasing the surface tackiness of an unvulcanized rubber, which comprises incorporating in a solid rubber consisting at least predominantly of diene hydrocarbon polymer, a salt of a rosin acid and an ethanolamine.

9. A process of increasing the surface tackiness of an unvulcanized rubber, which comprises incorporating in a solid rubber consisting at least predominantly of diene hydrocarbon polymer, a salt formed by reacting a rosin acid upon an amine of the class of aliphatic amines in which any oxygen is connected to the carbon by only one bond and consisting of cetyl dimethylamine, dioctylamine and ethanolamines.

IRA WILLIAMS.
CLINTON A. CARLTON.

REFERENCES CITED

The following references are of record in the file of this patent:

UNITED STATES PATENTS

| Number | Name | Date |
| --- | --- | --- |
| 1,467,197 | Russell | Sept. 4, 1923 |
| 1,746,875 | Teagne | Feb. 11, 1930 |
| 1,802,752 | Cadwell | Aug. 28, 1931 |
| 1,967,220 | Barrett | July 24, 1934 |
| 2,049,618 | Major | Aug. 4, 1936 |
| 2,163,609 | MacDonald | June 27, 1939 |
| 2,223,446 | Harmon | Dec. 3, 1940 |
| 2,234,204 | Starkweather | Mar. 11, 1941 |
| 2,265,364 | Fowler | Dec. 9, 1941 |
| 2,324,980 | Kilbourne | July 20, 1943 |
| 2,325,737 | Boys | Aug. 3, 1943 |
| 2,327,975 | Zaucker | Aug. 24, 1943 |
| 2,349,733 | Howland | May 23, 1944 |
| 2,374,969 | Audrieth | May 1, 1945 |
| 2,384,683 | Kistler | Sept. 11, 1945 |

OTHER REFERENCES

Stocklin, Trans Instit. Rubber Ind., vol. 15, pages 52 and 58, June 1939.

Hagen, India Rubber World, April 1943, vol. 108, No. 1, Translated from Kantschuk Nov. 1938.

Handbook of Chemistry and Physics, 28th edition 1944, page 1365, Chemical Rubber Publ. Co. (Copy in Div. 50.)